(12) United States Patent
Lee et al.

(10) Patent No.: US 11,300,657 B2
(45) Date of Patent: Apr. 12, 2022

(54) APPARATUS OF GENERATING JAMMING SIGNAL FOR DECEIVING TRANSMISSION/RECEPTION DEVICE AND METHOD THEREOF

(71) Applicant: AGENCY FOR DEFENSE DEVELOPMENT, Daejeon (KR)

(72) Inventors: Jung Hoon Lee, Daejeon (KR); Jeil Jo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 348 days.

(21) Appl. No.: 16/384,650

(22) Filed: Apr. 15, 2019

(65) Prior Publication Data
US 2019/0317188 A1  Oct. 17, 2019

(30) Foreign Application Priority Data
Apr. 16, 2018  (KR) .................. 10-2018-0043793

(51) Int. Cl.
| | | |
|---|---|---|
| *G01S 7/38* | (2006.01) | |
| *G01S 7/32* | (2006.01) | |
| *G01S 7/292* | (2006.01) | |
| *G01S 7/41* | (2006.01) | |
| *G01S 15/89* | (2006.01) | |

(52) U.S. Cl.
CPC .............. *G01S 7/38* (2013.01); *G01S 7/292* (2013.01); *G01S 7/32* (2013.01); *G01S 7/412* (2013.01); *G01S 15/8961* (2013.01)

(58) Field of Classification Search
CPC ... G01S 7/38; G01S 7/292; G01S 7/32; G01S 7/412; G01S 15/8961
See application file for complete search history.

(56) References Cited

U.S. PATENT DOCUMENTS

| | | | |
|---|---|---|---|
| 7,081,846 B1* | 7/2006 | Sparrow ................... | G01S 7/38 342/14 |
| 2003/0161411 A1* | 8/2003 | McCorkle ................ | H04B 1/74 375/295 |
| 2019/0033427 A1* | 1/2019 | Ic ........................... | G01S 19/015 |

FOREIGN PATENT DOCUMENTS

KR    10-1502399 B1    3/2015

OTHER PUBLICATIONS

Mudukutore, etal, "Pulse Compression for Weather Radars"; IEEE Transaction on Geoscience and Remote Sensing, vol. 36, No. 1, Jan. 1998, pp. 125-142 (Year: 1998).*

* cited by examiner

Primary Examiner — Donald HB Braswell
(74) Attorney, Agent, or Firm — Fenwick & West LLP

(57) ABSTRACT

There is provided an apparatus for generating a jamming signal for deceiving a transmission/reception device. The apparatus includes a reception unit configured to receive a signal transmitted from the transmission/reception device and a determination unit configured to determine whether or not the received signal is a pulse compression signal. The apparatus further includes a generation unit configured to determine, when the received signal is a pulse compression signal, a deception frequency based on a frequency bandwidth and a pulse width of the received pulse compression signal and generate the jamming signal based on the determined deception frequency.

7 Claims, 3 Drawing Sheets

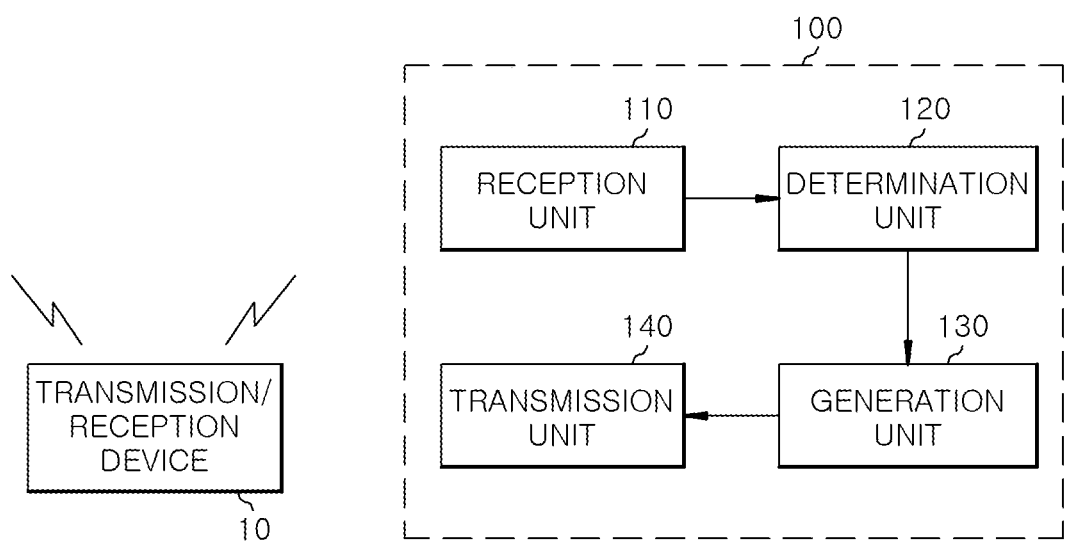

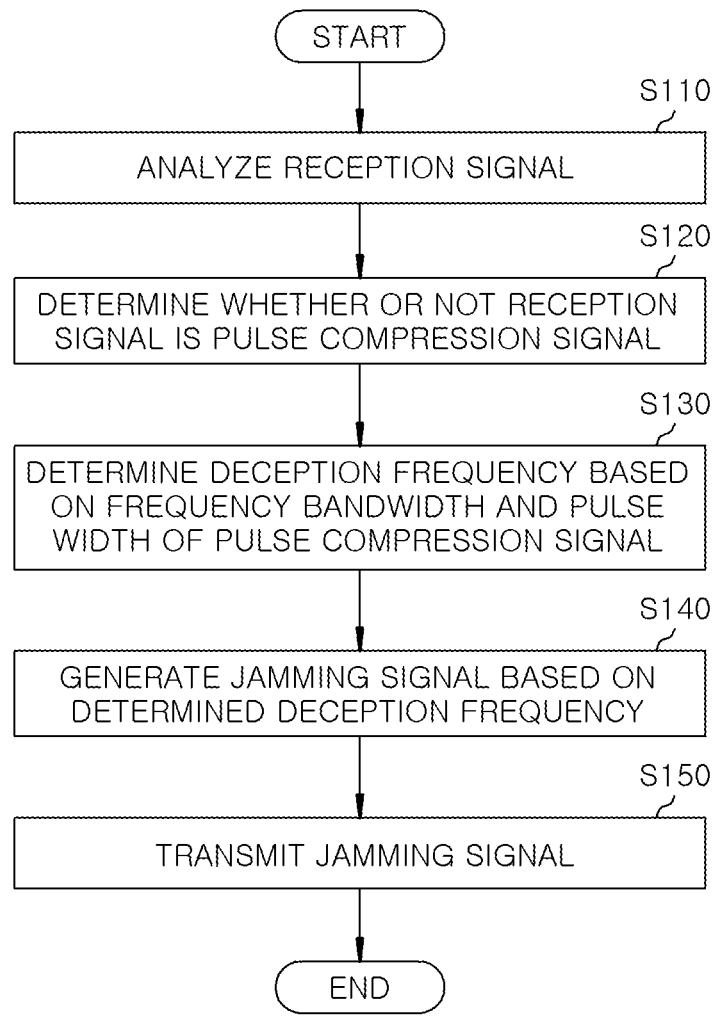

APPARATUS OF GENERATING JAMMING SIGNAL FOR DECEIVING TRANSMISSION/RECEPTION DEVICE AND METHOD THEREOF

CROSS-REFERENCE TO RELATED APPLICATION

This application claims priority to Republic of Korea Patent Application No. 10-2018-0043793, filed on Apr. 16, 2018, the entire contents of which is incorporated herein by reference.

TECHNICAL FIELD

The present disclosure relates to a technique for generating a jamming signal for deceiving a transmission/reception device. Specifically, the present disclosure relates to a technique for generating a jamming signal for deceiving a transmission/reception device using a pulse compression signal.

BACKGROUND

In the field of communication and sensor networks, a detecting device such as a radar (Radio Detection And Ranging) can increase a distance resolution by using a pulse with a short width. However, when the radar uses a short pulse width, the average strength of the transmission signal is decreased and the strength of the signal reflected at a target is also decreased. Since the strength of the signal that is reflected from the target and received by the radar is weak, it is difficult to detect a long distance target signal. Although the average strength of the transmission signal can be increased by increasing the pulse width of the radar, the distance resolution is remarkably decreased. Therefore, in a general radar, a pulse compression signal is used to increase the average strength of the transmission signal and the distance resolution.

The pulse compression signal is characterized in that it has a pulse width greater than that of a pulse signal that is not subjected to pulse compression and the pulse compression is used for frequency modulation of several MHz to several tens of MHz. The pulse compression signal can be easily used for tracking a target.

In electronic warfare, the tracking of the radar is interfered by performing radio interference on the signal that is transmitted from the radar to track the target. This is referred to as "EA (Electronic Attack)", and the jammer used in the electronic warfare is mounted on aircrafts or warships and performs jamming, i.e., the radio interference.

EA includes noise jamming, deception jamming, complex jamming, or the like. In the case of the noise jamming, the jamming is performed by generating a noise against the received radar signal. In the case of the deception jamming, the received radar signal is stored in a memory; a phase, a size, and the like of the stored signal are modulated; and the modulated signal is re-transmitted to the radar to thereby deceive the enemy with a false target. In the case of the complex jamming, the noise jamming and the deception jamming are used at the same time.

However, the noise jamming is disadvantageous in that a jamming signal whose strength is greater than the average strength of the transmission signal needs to be transmitted at a large bandwidth during the noise jamming. This is because the pulse compression signal generally has a large pulse width and a large bandwidth in order to increase the average strength of the transmission signal.

Further, the deception jamming can generate a jamming signal with less energy, compared to the noise jamming. However, there is a demand for a method for efficiently performing the deception jamming on a signal received from a radar using pulse compression.

SUMMARY

In view of the above, the present disclosure provides a technique for generating a frequency deception signal based on a bandwidth and a pulse width of a pulse compression signal received from a transmission/reception device, e.g., a radar, using pulse compression.

The drawbacks to be solved by the present disclosure are not limited to the aforementioned drawbacks, and other drawbacks that are not mentioned will be clearly understood by those skilled in the art.

In accordance with an aspect of the present disclosure, there is provided an apparatus for generating a jamming signal for deceiving a transmission/reception device, including: a reception unit configured to receive a signal transmitted from the transmission/reception device; a determination unit configured to determine whether or not the received signal is a pulse compression signal; and a generation unit configured to determine, when the received signal is a pulse compression signal, a deception frequency based on a frequency bandwidth and a pulse width of the received pulse compression signal and generate the jamming signal based on the determined deception frequency.

Further, when a value obtained by multiplying the frequency bandwidth and the pulse width of the received signal exceeds a preset value, the determination unit may determine that the received signal is the pulse compression signal.

Further, the deception frequency may be determined based on a center frequency of the received pulse compression signal.

Further, the deception frequency may fall within the frequency bandwidth of the received pulse compression signal.

Further, the deception frequency may satisfy the following equation:

$$\left(f_0 - \frac{B}{2}\right) \leq f_j \leq \left(f_0 + \frac{B}{2}\right)$$

wherein $f_j$ indicates the deception frequency; $f_0$ indicates the center frequency of the received pulse compression signal; and B indicates the frequency bandwidth of the received pulse compression signal.

Further, The apparatus described above may further include a transmission unit configured to transmit the generated jamming signal and a target echo signal obtained by reflection of the pulse compression signal from a target to the transmission/reception device.

Further, the transmission/reception device may be a detection device which includes a radar.

In accordance with another aspect of the present disclosure, there is provided a method for generating a jamming signal for deceiving a transmission/reception device, including: receiving a signal transmitted from the transmission/reception device; determining whether or not the received signal is a pulse compression signal; determining, when the received signal is the pulse compression signal, a deception frequency based on a frequency bandwidth and a pulse width of the received pulse compression signal; and generating the jamming signal based on the determined deception frequency.

Further, a step of determining whether or not the received signal is the pulse compression signal may include determining whether or not a value obtained by multiplying the frequency bandwidth and the pulse width of the received signal exceeds a preset value.

Further, the deception frequency may be determined based on a center frequency of the received pulse compression signal.

Further, the deception frequency may fall within the frequency bandwidth of the received pulse compression signal.

Further, the deception frequency satisfies the following equation:

$$\left(f_0 - \frac{B}{2}\right) \le f_j \le \left(f_0 + \frac{B}{2}\right)$$

wherein $f_j$ indicates the deception frequency; $f_0$ indicates the center frequency of the received pulse compression signal; and B indicates the frequency bandwidth of the received pulse compression signal.

Further, the method described above may further include transmitting the generated jamming signal and a target echo signal obtained by reflection of the pulse compression signal from a target to the transmission/reception device.

Further, the transmission/reception device may be a detection device which includes a radar.

In accordance with still another aspect of the present disclosure, there is provided a system including: an apparatus configured to generate a jamming signal for deceiving a transmission/reception device. The apparatus includes a reception unit configured to receive a signal transmitted from the transmission/reception device; a determination unit configured to determine whether or not the received signal is a pulse compression signal; and a generation unit configured to determine, when the received signal is the pulse compression signal, a deception frequency based on a frequency bandwidth and a pulse width of the received pulse compression signal and generate the jamming signal based on the determined deception frequency.

In accordance with the embodiments of the present disclosure, it is possible to efficiently perform jamming for an enemy radar using a pulse compression signal without a jamming signal having a high output by generating a frequency deception signal based on a frequency bandwidth and a pulse width of the pulse compression signal received from the radar using pulse compression.

BRIEF DESCRIPTION OF THE DRAWINGS

The objects and features of the present disclosure will become apparent from the following description of embodiments, given in conjunction with the accompanying drawings, in which:

FIG. 2 is a block diagram of an apparatus for generating a frequency deception signal for a pulse compression signal according to an embodiment of the present disclosure.

FIG. 3 is a flowchart of a method of generating a frequency deception signal for a pulse compression signal according to an embodiment of the present disclosure.

DETAILED DESCRIPTION

Figure 1:
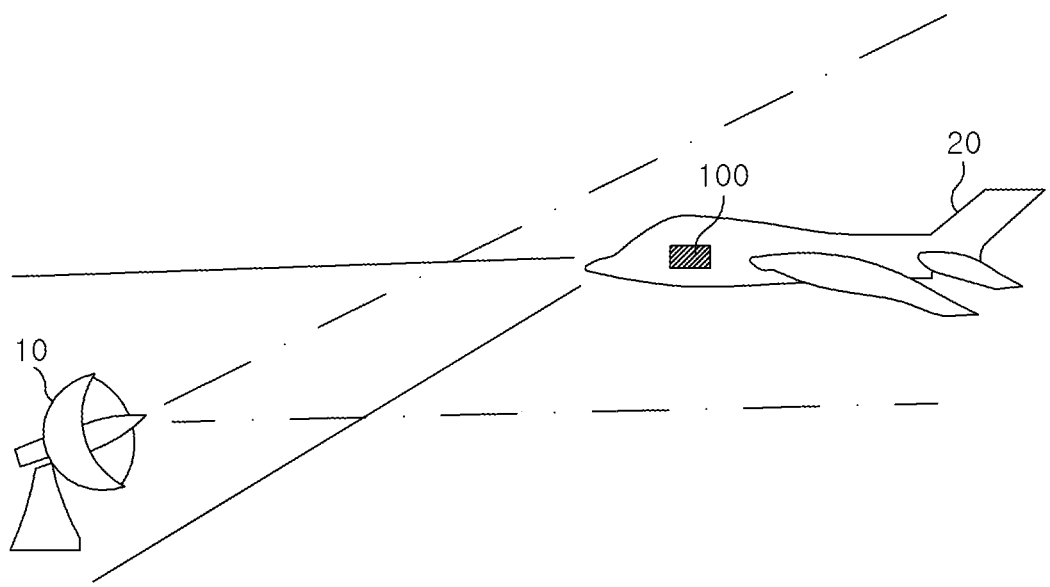
FIG. 1 is a conceptual diagram showing a transmission/reception device for transmitting a pulse compression signal and a target provided with an apparatus for generating a jamming signal for deceiving the transmission/reception device.

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

In the embodiment of the present disclosure, there is suggested a technique for generating a frequency deception signal based on a frequency bandwidth and a pulse width of a pulse compression signal received from a transmission/reception device using pulse compression, e.g., a radar.

Hereinafter, embodiments of the present disclosure will be described in detail with reference to the accompanying drawings.

FIG. 1 is a conceptual diagram showing a transmission/reception device 10 for transmitting a pulse compression signal and a target 20 provided with a jamming signal generation apparatus 100 for generating a deception signal for a pulse compression signal.

The transmission/reception device 10 may be installed at, e.g., an enemy's radar, aircraft, ship, or the like that tracks a certain target. The transmission/reception device 10 is configured to transmit a pulse compression signal in order to increase a distance resolution while detecting a long distance target signal. In the case of the pulse compression signal, a pulse compression technique for frequency modulation is used at a pulse width that is relatively greater than that of a general signal and a bandwidth of several MHz to several tens of MHz.

The target 20 may be, e.g., our forces' aircraft, ship, or the like, which comprises a radar. The deception signal generation apparatus 100 according to an embodiment may be installed or provided at the target 20. Although an aircraft is illustrated as the target 20 in FIG. 1, it is merely an example. The target 20 is not particularly limited as long as the deception signal generation apparatus 100 according to the embodiment can be installed.

FIG. 2 is a block diagram of a deception signal generation apparatus 100 for generating a frequency deception signal for a pulse compression signal according to an embodiment of the present disclosure.

As shown in FIG. 2, the deception signal generation apparatus 100 is configured to receive a signal transmitted from the transmission/reception device 10, generate a jamming signal for deceiving the transmission/reception device 10 based on the received signal, and re-transmit the jamming signal to the transmission/reception device 10. Therefore, the deception signal generation apparatus 100 may include a reception unit 110, a determination unit 120, a generation unit 130, and a transmission unit 140.

First, the reception unit 110 is configured to receive the signal transmitted from the transmission/reception device 10. The reception unit 110 may include, e.g., a reception module, a reception antenna, or the like of a radar installed at the target.

The determination unit 120 is configured to analyze a signal received by the reception unit 110 and determine whether or not the received signal is a pulse compression signal based on the analysis result. For example, the determination unit 120 may determine whether or not the received signal is a pulse compression signal by analyzing the frequency bandwidth and the pulse width of the received signal and/or by determining whether or not a value obtained by multiplying the frequency bandwidth and the pulse width exceeds a threshold value.

The generation unit 130 is configured to determine a deception frequency based on the frequency bandwidth and the pulse width that are analyzed by the determination unit 120, and generate a jamming signal based on the determined deception frequency.

The jamming signal generated by the generation unit 130 can be transmitted to the transmission/reception device 10 by the transmission unit 140.

Here, the determination unit 120 and the generation unit 130 may be indicated as a single block. Although the determination unit 120 and the generation unit 130 are divided into separate blocks for functional explanation, this is merely an example, and the functions of determination, generation, or the like can be realized by a control device, e.g., a microprocessor, in the deception signal generation apparatus 100.

The specific configurations of the determination unit 120 and the generation unit 130 will be described in detail with reference to FIG. 3.

FIG. 3 is a flowchart of a method of generating a frequency deception signal for a pulse compression signal according to an embodiment of the present disclosure. Hereinafter, a frequency deception process according to an embodiment of the present disclosure including the above-described configurations shown in FIG. 1 will be described in detail.

As shown in FIG. 3, the determination unit 120 analyzes the signal received by the reception unit 110.

For example, the determination unit 120 receives the signal transmitted from the transmission/reception device 10 to the reception unit 110 and analyzes the center frequency, the frequency bandwidth, and the pulse width of the received (reception) signal (step S110).

When the transmission/reception device 10 is a radar using a pulse compression signal, the received pulse compression signal can be expressed by the following Eq. (1).

$$S(t) = A * \cos\left(2\pi\left(f_o(t-t_i) + \frac{\mu(t-t_i)^2}{2}\right)\right) \qquad \text{<Eq. 1>}$$

Here, A indicates a received signal strength of the pulse compression signal; $f_o$ indicates a center frequency of the pulse compression signal; $t_i$ and indicates a delay time of a target echo signal. μ equals B/T(μ=B/T), where B indicates a frequency bandwidth of the pulse compression signal, and T indicates the pulse width of the pulse compression signal.

The determination unit 120 receives the signal transmitted from the transmission/reception device 10 and analyzes the characteristics of the received signal as shown in the Eq. (1).

Next, the determination unit 120 determines whether or not the signal received by the reception unit 110 is a pulse compression signal based on the pulse width and the frequency bandwidth that are analyzed in step S110 (step S120). Whether or not the received signal is a pulse compression signal can be determined by determining whether or not a value (Time-bandwidth product) obtained by multiplying the frequency bandwidth and the pulse width of the received signal exceeds a preset threshold value. This can be expressed by the following Eq. (2).

$$B \cdot T > k \qquad \text{<Eq. 2>}$$

Here, k indicates the threshold value. If the value obtained by multiplying the frequency bandwidth and the pulse width exceeds k, it is determined that the received signal is a pulse compression signal. Here, k is a constant and can be set within a range from 15 to 20.

If it is determined that the received signal is a pulse compression signal, the generation unit 130 determines a deception frequency based on the frequency bandwidth and the pulse width of the received signal (step S130).

It is preferable that the deception frequency is generated within the frequency modulation bandwidth of the pulse compression signal. The range of the deception frequency $f_j$ can be expressed by the following Eq. (3).

$$\left(f_0 - \frac{B}{2}\right) \le f_j \le \left(f_0 + \frac{B}{2}\right) \qquad \text{<Eq. 3>}$$

Here, $f_o$ indicates the center frequency of the received pulse compression signal, and B indicates the frequency bandwidth of the received pulse compression signal.

The generation unit 130 generates a jamming signal based on the determined deception frequency (step S140).

The transmission unit 140 transmits the jamming signal generated by the generation unit 130 to the transmission/reception device 10 (step S150).

The deception signal generation apparatus 100 according to the embodiment performs jamming only when the pulse signal is received. Therefore, a repeater section in which the prediction of the interval between the compressed pulses is not required can be used. In other words, the deception signal may be transmitted in a section in which the pulse signal is turned on, and the deception signal may not be transmitted in a section in which the pulse signal is turned off.

Both of the target echo signal and the jamming signal may be transmitted to the space by jamming. This can be expressed by the following Eq. (4).

$$S(t) = S * \cos\left(2\pi\left(f_o(t-t_i) + \frac{\mu(t-t_i)^2}{2}\right)\right) + J * \cos(2\pi(f_o - f_j)t) \qquad \text{<Eq. 4>}$$

Here, S indicates a magnitude of the target echo signal, and J indicates a magnitude of the transmission signal of the deception signal generation apparatus 100.

Then, the transmission/reception device 10 receives the target echo signal and the jamming signal from the deception signal generation apparatus 100 at the same time. The target echo signals and the jamming signal received at the same time can be down-converted by a local signal. The local signal used at this time can be expressed by the following Eq. (5).

$$S_L(t) = \cos\left(2\pi\left(f_o t + \frac{\mu t^2}{2}\right)\right) \qquad <\text{Eq. 5}>$$

Here, it is assumed that the magnitude of the local signal is 1. The multiplication of the local signal and the received signal can be expressed by the following Eq. (6).

$$S(t)S_L(t) = \left[S * \cos\left(2\pi\left(f_o(t-t_i) + \frac{\mu(t-t_i)^2}{2}\right)\right) + \right. \qquad <\text{Eq. 6}>$$
$$\left. J * \cos(2\pi(f_o - f_J)t)\right]\cos\left(2\pi\left(f_o t + \frac{\mu t^2}{2}\right)\right)$$

The transmission/reception device 10 simultaneously receives the signal obtained by down-converting the target echo signal and the signal obtained by down-converting the jamming signal, via a low pass filter. This can be expressed by the following Eq. (7).

$$S(t)S_L(t)|_{LPF} \approx \qquad <\text{Eq. 7}>$$
$$\frac{S}{2}\cos(2\pi f_o t_o + 2\pi\mu t_o t - \pi\mu t_o^2) + \frac{J}{2}\cos(2\pi f_J t + \pi\mu t_o^2)$$

The instantaneous frequency of the target echo signal received by the transmission/reception device 10 can be expressed by the following Eq. (8), and the instantaneous frequency of the jamming signal received by the transmission/reception device 10 can be expressed by the following Eq. (9).

$$f_s = \frac{1}{2\pi}\frac{d}{dt}(2\pi f_o t_o + 2\pi\mu t_o t - \pi\mu t_o^2) \qquad <\text{Eq. 8}>$$
$$= \mu t_o$$

$$f_J = \frac{1}{2\pi}\frac{d}{dt}(2\pi f_J t + \pi\mu t_o^2) \qquad <\text{Eq. 9}>$$
$$= f_J$$

Finally, the transmission/reception device 10 receives the frequency component of the target echo signal and the frequency component of the jamming signal. If the strength of the target echo signal is greater than that of the jamming signal, the transmission/reception unit 10 receives a signal corresponding to the frequency component of the target echo signal. On the other hand, if the strength of the jamming signal transmitted to the transmission/reception device 10 is greater than that of the target echo signal, the transmission/reception device 10 receives a signal corresponding to the frequency of the jamming signal.

Therefore, the deception signal generation apparatus 100 can transmit a signal to the transmission/reception device 10 at a high JSR (Jamming to Signal Ratio). As a result, when the transmission/reception device 10 receives a signal having a high JSR, the target echo signal is suppressed by the jamming signal and the transmission/reception device 10 cannot track the target.

In accordance with the above-described embodiments of the present disclosure, it is possible to efficiently perform jamming for deceiving an enemy radar by re-transmitting the signal for frequency deception to the radar based on the frequency bandwidth and the pulse width of the pulse compression signal received from the transmission/reception device, e.g., the radar, using pulse compression.

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the present disclosure has been shown and described with respect to the embodiments, it will be understood by those skilled in the art that various changes and modifications may be made without departing from the scope of the present disclosure as defined in the following claims.

What is claimed is:

1. An apparatus for generating a jamming signal for deceiving a transmission/reception device, comprising:
   a reception unit configured to receive a signal transmitted from the transmission/reception device;
   a determination unit configured to determine whether or not the received signal is a pulse compression signal by analyzing a center frequency, a frequency bandwidth and a pulse width of the received signal and determine that the received signal is the pulse compression signal when a value obtained by multiplying the frequency bandwidth and the pulse width of the received signal exceeds a preset value; and
   a generation unit configured to determine, when the received signal is the pulse compression signal, a deception frequency of the jamming signal to be transmitted from the apparatus based on the frequency bandwidth and the center frequency of the pulse compression signal to allow the deception frequency to be within the frequency bandwidth of the pulse compression signal while satisfying an equation of $(f_0-B/2) \leq f_j \leq (f_0+B/2)$ wherein $f_j$ indicates the deception frequency; $f_0$ indicates the center frequency of the pulse compression signal; and B indicates the frequency bandwidth of the pulse compression signal, the generation unit generating the jamming signal based on the determined deception frequency.

2. The apparatus of claim 1, further comprising:
a transmission unit configured to transmit the generated jamming signal and a target echo signal obtained by reflection of the pulse compression signal from a target to the transmission/reception device.

3. The apparatus of claim 1, wherein the transmission/reception device is a detection device which includes a radar.

4. A method for generating a jamming signal for deceiving a transmission/reception device, comprising:
receiving a signal transmitted from the transmission/reception device;
determining whether or not the received signal is a pulse compression signal by analyzing a center frequency, a frequency bandwidth and a pulse width of the received signal and determine that the received signal is the pulse compression signal when a value obtained by multiplying the frequency bandwidth and the pulse width of the received signal exceeds a preset value;
determining, when the received signal is the pulse compression signal, a deception frequency of the jamming signal to be transmitted from the apparatus based on the frequency bandwidth and the center frequency of the pulse compression signal to allow the deception frequency to be within the frequency bandwidth of the pulse compression signal while satisfying an equation of $(f_0-B/2) \leq f_j \leq (f_0+B/2)$ wherein $f_j$ indicates the deception frequency; $f_0$ indicates the center frequency of the pulse compression signal; and B indicates the frequency bandwidth of the pulse compression signal, the generation unit generating; and
generating the jamming signal based on the determined deception frequency.

5. The method of claim 4, further comprising:
transmitting the generated jamming signal and a target echo signal obtained by reflection of the pulse compression signal from a target to the transmission/reception device.

6. The method of claim 4, wherein the transmission/reception device is a detection device which includes a radar.

7. A system comprising:
an apparatus configured to generate a jamming signal for deceiving a transmission/reception device,
wherein the apparatus includes:
a reception unit configured to receive a signal transmitted from the transmission/reception device;
a determination unit configured to determine whether or not the received signal is a pulse compression signal by analyzing a center frequency, a frequency bandwidth and a pulse width of the received signal and determine that the received signal is the pulse compression signal when a value obtained by multiplying the frequency bandwidth and the pulse width of the received signal exceeds a preset value; and
a generation unit configured to determine, when the received signal is the pulse compression signal, a deception frequency of the jamming signal to be transmitted from the apparatus based on the frequency bandwidth and the center frequency of the pulse compression signal to allow the deception frequency to be within the frequency bandwidth of the pulse compression signal while satisfying an equation of $(f_0-B/2) \leq f_j \leq (f_0+B/2)$ wherein $f_j$ indicates the deception frequency; $f_0$ indicates the center frequency of the pulse compression signal; and B indicates the frequency bandwidth of the pulse compression signal, the generation unit generating the jamming signal based on the determined deception frequency.

* * * * *